(12) United States Patent
Andrew et al.

(10) Patent No.: US 7,355,297 B2
(45) Date of Patent: Apr. 8, 2008

(54) METHODS AND APPARATUS FOR ELECTRIC POWER GRID FREQUENCY STABILIZATION

(75) Inventors: Philip Lynn Andrew, Simpsonville, SC (US); John Edward Ford, Niskayuna, NY (US); Timothy Andrew Melsert, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/846,297

(22) Filed: Aug. 28, 2007

(65) Prior Publication Data

US 2007/0290507 A1 Dec. 20, 2007

Related U.S. Application Data

(62) Division of application No. 11/298,995, filed on Dec. 9, 2005, now Pat. No. 7,274,111.

(51) Int. Cl.
*H02P 9/04* (2006.01)
*F02C 6/00* (2006.01)

(52) U.S. Cl. ............................ 290/52; 290/2; 290/4 R; 60/39

(58) Field of Classification Search ............... 290/1 A, 290/2, 4 R, 4 D, 52; 60/39, 182, 773
See application file for complete search history.

(56) References Cited

U.S. PATENT DOCUMENTS

| | | | |
|---|---|---|---|
| 3,955,359 A | 5/1976 | Yannone et al. | |
| 4,259,835 A | 4/1981 | Reed et al. | |
| 6,244,037 B1 | 6/2001 | Nakhamkin et al. | |
| 6,250,877 B1 | 6/2001 | Westphal et al. | |
| 6,301,895 B1 | 10/2001 | Kallina et al. | |
| 6,378,285 B1 | 4/2002 | Blatter et al. | |
| 6,474,069 B1 | 11/2002 | Smith | |
| 6,494,045 B2 | 12/2002 | Rollins, III | |
| 6,606,848 B1 | 8/2003 | Rollins, III | |
| 6,766,646 B1 | 7/2004 | Ford et al. | |
| 6,792,759 B2 | 9/2004 | Rollins, III | |
| 6,794,766 B2 | 9/2004 | Wickert et al. | |
| 6,810,675 B2 * | 11/2004 | Liebig | 60/773 |
| 7,007,453 B2 | 3/2006 | Maisotsenko et al. | |
| 7,045,913 B2 | 5/2006 | Ebrahim et al. | |
| 7,078,825 B2 | 7/2006 | Ebrahim et al. | |
| 7,131,259 B2 | 11/2006 | Rollins, III | |
| 7,274,111 B2 * | 9/2007 | Andrew et al. | 290/52 |
| 2003/0167774 A1 | 9/2003 | Bescherer et al. | |

* cited by examiner

*Primary Examiner*—Nicholas Ponomarenko
(74) *Attorney, Agent, or Firm*—Armstrong Teasdale LLP

(57) ABSTRACT

A method and apparatus for operating a combined-cycle power system is provided. The system is coupled to an electric power grid. The system includes at least one electric power generator, at least one steam turbine coupled to the generator, at least one combustion turbine coupled to the generator, and at least one steam source that is in flow communication with the steam turbine. The method includes operating the system at a first power output level with the steam turbine and the combustion turbine being synchronized to an operating frequency of the grid, so that the steam turbine, the combustion turbine, and the grid are operating at a frequency substantially similar to a standardized grid frequency value. The method also includes sensing a grid frequency deviation away from the standardized grid frequency value. The method further includes accelerating or decelerating the turbines and facilitating a predetermined rate of grid frequency recovery for a predetermined period of time, such that the predetermined rate of frequency recovery is substantially uniform.

12 Claims, 4 Drawing Sheets

METHODS AND APPARATUS FOR ELECTRIC POWER GRID FREQUENCY STABILIZATION

CROSS-REFERENCE TO RELATED APPLICATIONS

This application is a divisional of U.S. patent application Ser. No. 11/298,995, filed Dec. 9, 2005 now U.S. Pat. No. 7,274,111, which is hereby incorporated by reference and is assigned to assignee of the present invention.

BACKGROUND OF THE INVENTION

This invention relates generally to electric power grids and more particularly, to methods and apparatus for operating combined-cycle power systems.

The term "full load" is used herein interchangeably with "rated output" and "maximum continuous rating" (MCR). These terms refer to an upper range of continuous operation output for the power system and its associated components. "Partial load" refers to an output level below full load.

Electric power grids typically include a number of power generating systems to supply electricity to the grid and a number of electricity consumers that draw electricity from the grid. When the generation and consumption of electricity are substantially equal, the grid frequency is substantially constant. Grid frequency is normally a parameter maintained at a substantially stable value. Examples of nominal standard grid frequencies for the European and North American systems are 50 Hz and 60 Hz, respectively.

Frequency deviations of a transient nature may result from increased or decreased consumption and/or removal or addition of power generation systems. Increased consumption and removal of power generation systems tends to cause a decrease of the grid frequency. Decreased consumption and addition of power generation systems tends to cause an increase of the grid frequency. Power consumption and power generation are time-dependent variables which may cause frequency variations in a range of approximately +0.5 Hz to −0.5 Hz. Generally, frequency transients are of a short duration, i.e., measured in seconds to minutes, and as discussed above, small magnitudes. The magnitude of a frequency transient is typically influenced by a ratio of the magnitude of a power variation to the total power level within the grid and associated interconnected grids throughout the duration of the variation. The aforementioned small magnitude frequency transients are consistent with the small size of a typical power variation as compared to the typically large size of nominal interconnected grids. Also, in general, power grids tend to be self-correcting with respect to maintaining grid frequency within a substantially constant range. For example, in the event of a frequency deviation from a standard value, a near-term variation in power generation spread over a number of power generator systems may be facilitated by at least one control system and at least one control strategy to mitigate the magnitude and the duration of the frequency transient such that frequency transients normally do not impact consumers.

Larger frequency transients such as transients greater than approximately +0.5 Hz to −0.5 Hz and due, for example, to a frequency decrease as a result of an immediate loss of one or more power generators, sometimes referred to as a trip, may tend to induce a large frequency decrease. One possible method to mitigate the frequency transient magnitude and duration is to have some amount of standby power generation capacity, sometimes referred to as system reserve, available within the grid to respond to the frequency decrease within seconds of the transient. For example, a particular generating unit on the grid may be induced to initiate a fast increase in its associated power generation output to the grid.

Many known power generation facilities include either steam turbine generators (STG), combustion turbine generators (CTG), or some combination thereof. These configurations typically include a turbine rotatably coupled to an associated electric generator. The generator frequency is normally synchronized to the electric power grid frequency and rotates at a speed substantially similar to the grid frequency.

Many known STGs operate in flow communication with a steam generation apparatus, for example, a boiler. Generally, air and fuel are combusted to release thermal energy that is subsequently used to boil water to generate steam. The steam generated is channeled to a turbine wherein the thermal energy of the steam is converted to mechanical energy to rotate the rotor of the turbine. The power generated is proportional to the rate of steam flow to the turbine.

One known method of maintaining a power reserve is to operate a STG with at least one associated steam supply control valve in a partially open, or throttled, position such that the steam generator, the STG and the power grid are in an equilibrium, sometimes referred to as a steady-state condition, operating at some value less than full rated load of the steam generator and STG arrangement. The difference between full load and partial load is often referred to as spinning reserve. A controller is utilized to sense a decrease in system frequency and to generate a control signal transmitted to the steam valve within seconds of sensing a frequency transient. The control signal causes the valve to move to a more open position and thermal energy stored within the components of the steam generation apparatus, for example, the superheater, begins to be removed immediately via increased steam flow through the steam generator. Cooling fluid, air and fuel are subsequently increased over time to facilitate establishing a modified equilibrium between the steam generator, the STG and the power grid. However, many steam generator and STG combinations may take two to five minutes to attain the modified equilibrium while operating within predetermined parameters to mitigate the potential for increased stress and wear on affected components. Also, the amount of thermal energy typically stored in the aforementioned manner is limited. In addition, many steam generator and STG combinations may not effectively respond to a grid frequency transient with a stable, controlled response. For example, the aforementioned steam valve to the STG may open too quickly and deplete the thermal energy reserve too rapidly to deliver a sustained, effective response. Alternatively, the steam valve to the STG may open too slowly to deliver a timely, effective response.

Many known CTGs ignite a fuel-air mixture in a combustor assembly and generate a combustion gas stream that is channeled to a turbine assembly via a hot gas path. Compressed air is channeled to the combustor assembly by a compressor assembly that is normally coupled to the turbine, i.e., the compressor, turbine and generator rotate at the same speed. The power generated is proportional to the rate of combustion gas flow to the turbine and the temperature of the gas flow stream. Typically, many known CTGs have an operationally more dynamic behavior than STG (and their associated steam sources), therefore, CTGs may respond to system transients more rapidly.

One known method of maintaining a power reserve is to operate a CTG with at least one associated air guide vane and at least one fuel supply valve in a partially open, or throttled, position such that the CTG and the power grid are in an equilibrium, operating at some value less than the full rated load of the CTG. As discussed above for the STG, the difference between full load and the partial load is often referred to as spinning reserve. A controller senses a decrease in grid frequency and generates a signal that causes the air inlet guide vane and the fuel supply valve to open further within seconds of sensing the frequency transient. Since the compressor, the turbine and the generator are coupled to the same shaft, and since the generator that is synchronized to the grid decelerates as grid frequency is decreased, there exists an initial bias to channel less air into the CTG. This condition initiates a decreasing bias in CTG electric power generation that may negatively impact subsequent activities to increase CTG electric power generation. Furthermore, a bias to decrease air flow followed by a bias to increase air flow through the associated compressor may introduce a potential for a compressor surge, i.e., a substantially uncontrolled fluctuation of air flow and compressor discharge pressure, with surge potential being more pronounced at the lower end of compressor rated air flows. As the vane opens to increase the air flow and as the valve opens to increase the fuel flow, the mass flow rate of the combustion gas and the combustion gas temperature begin to increase within seconds of sensing the system frequency transient. Air and fuel are subsequently increased over time to facilitate establishing a modified equilibrium between the CTG and the power grid. In order to overcome the initial bias to decrease generation and then to accelerate the CTG, the combustion turbine may need to peak-fire, i.e., rapidly increase the rate of combustion to rapidly increase gas stream temperature while the subsequent increase of air flow follows. While the CTG may exhibit a more dynamic ability to respond to a frequency transient, many known CTGs may have temperature and temperature gradient limitations that may extend the time duration for increasing gas stream temperatures in order to mitigate stresses on a portion of the materials associated with the CTG. Otherwise, component stresses may increase and their associated life span may be negatively affected.

Many known steam generation apparatus and CTG are thermally most efficient operating in a range near the upper end of their operational power generation range. Maintaining a power generation level below that range may decrease thermal efficiency with a subsequent increase in cost of operation as well as possibly deny the owners of the facility potential revenue from the sale of the electric power held in reserve and routinely not generated.

Many known combined-cycle electric power generation facilities typically include at least one CTG and at least one STG. Some known configurations for such facilities include channeling the combustion gas exhaust from a CTG to a heat recovery steam generator (HRSG), wherein the thermal energy from the combustion gas exhaust boils water into steam, the steam subsequently being channeled to a STG. Typically, combined-cycle facilities are configured to use a CTG as the primary response mechanism for grid frequency transients while a STG is maintained as the secondary response. While this physical configuration offers benefits of efficiency and therefore economy of operation, the response configuration and method includes at least some of the aforementioned challenges in responding rapidly and effectively to a grid frequency transient.

BRIEF DESCRIPTION OF THE INVENTION

In one aspect, a method of operating a combined-cycle power system is provided. The system is coupled to an electric power grid. The system includes at least one electric power generator, at least one steam turbine coupled to the generator, at least one combustion turbine coupled to the generator, and at least one steam source having a thermal energy reservoir. The thermal energy reservoir is in flow communication with the steam turbine via at least one control valve. The method includes operating the steam turbine at a first electric power output, operating the combustion turbine at a first electric power output, and operating the steam source at a first thermal energy level. The steam turbine has at least one control valve in a first position and the combustion turbine has at least one air inlet guide vane in a first position. The steam turbine and the combustion turbine are synchronized to an operating frequency of the grid, so that the steam turbine, the combustion turbine, and the grid are operating at a frequency substantially similar to a standardized grid frequency value. The method also includes sensing a grid frequency deviation away from the standardized grid frequency value. Upon the occurrence of such a deviation, the method further includes moving the at least one steam turbine control valve to a second position, causing a thermal energy transfer between the thermal energy reservoir and the steam turbine, and moving the thermal energy reservoir energy level to a second energy level, thereby facilitating a predetermined rate of a grid frequency recovery for a predetermined period of time, such that the predetermined rate of frequency recovery is substantially uniform. The method also includes moving the at least one combustion turbine air inlet guide vane to a second position, thereby facilitating a predetermined rate of a grid frequency recovery for a predetermined period of time.

In another aspect, an electric power grid frequency control sub-system for a combined-cycle power system is provided. The control sub-system includes at least one steam turbine. The steam turbine includes at least one pipe and the pipe includes at least one steam flow control valve. The sub-system also includes at least one steam source in flow communication with the steam turbine via the pipe. The steam source includes at least one thermal energy reservoir. The sub-system further includes at least one combustion turbine and the combustion turbine includes at least one air inlet guide vane. The sub-system also includes at least one electric power generator. The generator is electrically coupled to an electric power grid and the generator frequency and the grid frequency are synchronized to an operating frequency of the grid, such that the steam turbine, the combustion turbine, and the grid are operating at a frequency substantially similar to a standardized grid frequency value. The sub-system further includes a plurality of process feedback mechanisms and the feedback mechanisms include a plurality of process measurement sensors. The sub-system also includes at least one electronic controller. The at least one electronic controller includes at least one electronically stored control program, a plurality of electronic input channels, a plurality of electronic output channels, and at least one operator interface device. The at least one steam flow control valve and the at least one air inlet guide vane cooperate to continuously facilitate a predetermined rate of a grid frequency recovery for a predetermined period of time, such that the predetermined rate of frequency recovery is substantially uniform.

In a further aspect, a combined-cycle power system is provided. The system includes at least one steam turbine.

The steam turbine includes at least one pipe and the pipe includes at least one steam flow control valve. The at least one steam flow control valve is moved toward a substantially open position in response to a grid under-frequency condition and toward a substantially closed position in response to a grid over-frequency condition. The system also includes at least one steam source in flow communication with the steam turbine via the pipe. The steam source includes at least one thermal energy reservoir and the at least one thermal energy reservoir includes at least one cavity. The system further includes at least one combustion turbine. The combustion turbine includes at least one air inlet guide vane. The at least air one inlet guide vane is moved toward a substantially open position in response to a grid under-frequency condition and toward a substantially closed position in response to a grid over-frequency condition. The system also includes at least one electric power generator. The generator is electrically coupled to an electric power grid. The generator frequency and the grid frequency are synchronized to an operating frequency of the grid, such that the steam turbine, the combustion turbine, and the grid are operating at a frequency substantially similar to a standardized grid frequency value. The system further includes a plurality of process feedback mechanisms and the feedback mechanisms include a plurality of process measurement sensors. The system also includes at least one electronic controller. The at least one electronic controller includes at least one electronically stored control program, a plurality of electronic input channels, a plurality of electronic output channels, and at least one operator interface device. The at least one steam flow control valve and said at least one air inlet guide vane cooperate to continuously facilitate a predetermined rate of a grid frequency recovery for a predetermined period of time, such that the predetermined rate of frequency recovery is substantially uniform.

DETAILED DESCRIPTION OF THE INVENTION

Figure 1:
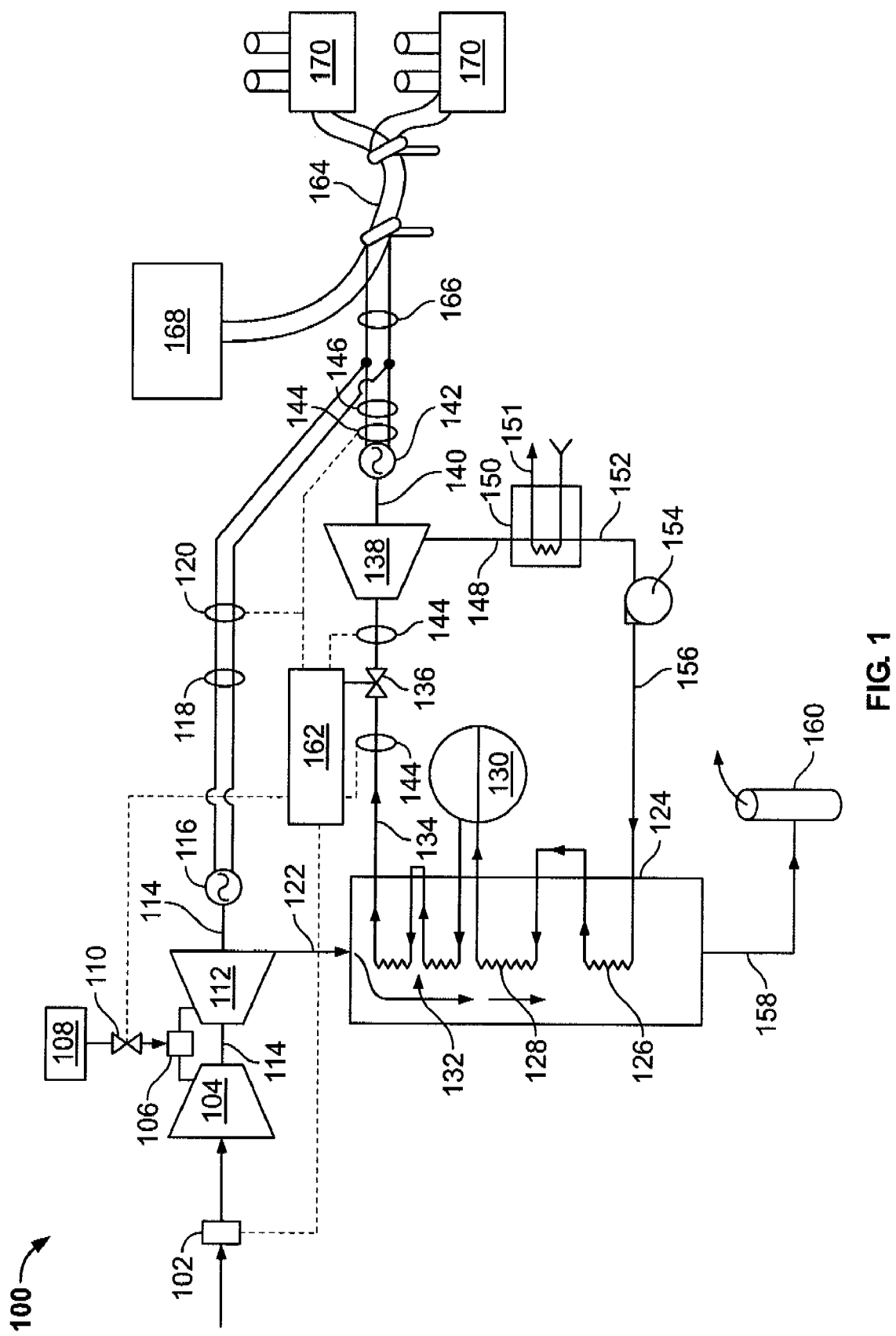
FIG. 1 is a schematic illustration of an exemplary combined-cycle power system.

FIG. 1 is a schematic illustration of an exemplary combined-cycle power generation system 100. System 100 includes at least one combustion turbine air inlet guide vane 102, a combustion turbine compressor 104 that is in flow communication with at least one combustor 106, a fuel storage facility 108 also in flow communication with combustor 106 via at least one fuel supply valve 110, a combustion turbine 112, a common shaft 114, a combustion turbine generator (CTG) 116 that is rotatably coupled to compressor 104 and turbine 112 via shaft 114, a generator output connection 118, a plurality of CTG sensors 120, and a combustion turbine exhaust gas duct 122 in flow communication with a heat recovery steam generator (HRSG) 124. HRSG 124 includes a first set of tube banks 126, a second set of tube banks 128, a steam drum 130, and a third set of tube banks 132 with tube banks 126, 128, 132 and drum 130 in flow communication with each other. System 100 further includes a superheated steam header 134 in flow communication with a steam turbine 138 via at least one steam turbine control valve 136. A common shaft 140 rotatably couples turbine 138 to a steam turbine generator (STG) 142. System 100 further includes a plurality of STG sensors 144 and a generator output connection 146. Furthermore, a steam turbine steam exhaust duct 148, a heat exchange apparatus 150, a steam condensing apparatus 151 with cooling water flow, a condensate supply header 152, a condensate/feedwater pump 154, and a feedwater supply header 156 are in flow communication with each other. A HRSG gas exhaust duct 158 is in flow communication with HRSG 124 and a stack 160. Automated and manual control of system 100 is facilitated with a controller 162. Generators 116 and 142 are interconnected with an electric power grid 164 via transmission lines 166. Consumers 168 are connected to grid 164 as are other power generation facilities 170.

Electric power is generated by CTG 116. Compressor 104 channels air to combustor 106 through air inlet guide vane 102. Alternatively, a plurality of fast-acting guide vanes may be used. Fuel is channeled to combustor 106 from storage facility 108 via fuel valve 110. In the exemplary embodiment storage facility 108 is a natural gas supply station. Alternatively, facility 108 may be a natural gas storage tank, a fuel oil storage tank or a fuel oil trailer. Also, alternatively, system 100 may include an Integrated Gasification Combined Cycle (IGCC) plant wherein facility 108 generates a synthetic gas. Combustor 106 ignites and combusts the fuel with the air to generate high temperature, i.e., approximately 1316° Celsius (C.) (2400° Fahrenheit (F.)), combustion gas that is subsequently channeled to turbine 112. In the exemplary embodiment, combustor 106 may ignite and combust natural gas or fuel oil, i.e., turbine 112 is a duel-fuel unit. Thermal energy in the combustion gas is converted to rotational energy in turbine 112. As described above, turbine 112 is rotatably coupled to compressor 104 and generator 116 via shaft 114, and compressor 104 and generator 116 rotate with turbine 112 with substantially similar rotational velocities. Generator 116 generates a voltage and an electric current at a frequency directly proportional to shaft 114 rotational velocities when generator 116 is not synchronized to grid 164. The electric power output of generator 116 is transmitted to grid 164 via interconnection 118 at a frequency substantially similar to grid 164 frequencies when generator 116 is synchronized to grid 164. Generator 116 may be controlled via an excitation system (not shown in FIG. 1). Plurality of sensors 120 may include at least one current transducer (not shown in FIG. 1), one voltage transducer (not shown in FIG. 1) and one frequency transducer (not shown in FIG. 1). The outputs of sensors 120 are transmitted to controller 162.

Electric power is also generated with STG 142. HRSG 124 transmits superheated steam to turbine 138 via steam header 134 and control valve 136. Control valve 136 is continuously biased via controller 162 to modulate steam flow to turbine 138 as discussed further below. Controller 162 receives input from sensors 144. In the exemplary embodiment, sensors 144 include pressure transducers immediately upstream and downstream of valve 136. Thermal energy in the steam is converted to mechanical energy in turbine 138 that rotates shaft 140. As described above, turbine 138 is rotatably coupled to generator 142 via shaft 140, and STG 142 rotates with turbine 138 with substantially similar rotational velocities. Generator 142 generates a voltage and an electric current at a frequency directly proportional to shaft 140 rotational velocities when generator 142 is not synchronized to grid 164. The electric power output of generator 142 is transmitted to grid 164 via interconnection 146 at a frequency substantial similar to grid 164 frequency when generator 142 is synchronized to grid 164. Generator 142 may be controlled via an excitation system (not shown in FIG. 1). Plurality of sensors 144 may include at least one current transducer (not shown in FIG. 1), one voltage transducer (not shown in FIG. 1) and one frequency transducer (not shown in FIG. 1). The outputs of sensors 144 are transmitted to controller 162.

Alternatively, a steam turbine assembly that includes a variety of configurations may be used. For example, a steam turbine assembly may include a high pressure section, an intermediate pressure section, and a low pressure section. Also, for another example, a steam turbine assembly and a combustion turbine assembly may be rotatably coupled to a single shaft rotatably driving a single generator.

Steam for turbine 138 is generated via HRSG 124. Alternatively, HRSG 124 may be replaced by an independently-fired boiler apparatus. In the exemplary embodiment, HRSG 124 receives exhaust gases from turbine 112 via duct 122. Generally, gas exhaust from combustion turbines includes usable thermal energy, with a temperature range of approximately 538° C. to 649° C. (1000° F. to 1200° F.), that is not converted to mechanical energy within turbine 112 to rotate shaft 114. Exhaust gases flow through HRSG 124 from the higher temperature steam generating components, illustrated in the exemplary embodiment as superheater tube banks 132, to the lower temperature tube banks 128 firstly, and then tube banks 126. Gas is channeled to duct 158 and subsequently to stack 160, generally via environmental control sub-systems (not shown in FIG. 1), that channels the gases to the environment. Generally, substantially little usable thermal energy remains in the gas stream upon exhaust to the environment.

Water is boiled to generate steam in HRSG 124. Sub-cooled water is stored in heat exchange apparatus 150. In the exemplary embodiment, apparatus 150 includes a main condenser that receives steam from turbine 138 via duct 148. Apparatus 150 also includes a cavity (not shown in FIG. 1) for water storage and condensing apparatus 151. In the exemplary embodiment, apparatus 151 includes a plurality of tubes that channels cooling water from a source (not shown in FIG. 1) that may include a cooling tower, a lake or a river. Steam exhausted from turbine 138 flows over the external surfaces of tubes 151 wherein thermal energy is transferred from the steam to the cooling water via tube 151 walls. Thermal energy removal from the steam induces a change in state of the fluid to a liquid form. The liquid collects within apparatus 150 from where it is channeled to pump 154 via suction header 152. In the exemplary embodiment, pump 154 is a feedwater pump. Alternatively, pump 154 may be a series of condensate booster pumps, condensate pumps and feedwater pumps. Also, alternatively, at least one feedwater heater that preheats feedwater prior to entry into HRSG 124 may be included in system 100. Feedwater enters first tube bank 126 and thermal energy is transferred from the combustion gas stream that flows over tube bank 126 surfaces to the feedwater within tubes 126. Heated feedwater is channeled to tube banks 128 wherein thermal energy is transferred to the feedwater in a manner substantially similar to that associated with tubes 126 with the exception that the gas stream has a higher temperature in the vicinity of tubes 128. Feedwater, that by this point is a combination of water and steam, is channeled to steam drum 130 from tubes 128. In the exemplary embodiment, steam drum 130 includes a plurality of steam/water separation devices (not shown in FIG. 1) that removes water from the steam and water flow stream and return the water to drum 130. Steam, with substantially most of the water removed, is further channeled to superheater tube banks 132 wherein the exhaust gas stream from turbine 112 is at its highest temperatures and transfers thermal energy to the steam within tubes 132 in a manner similar to that for tubes 126 and 128. Superheated steam is channeled to steam header 134 upon exit from HRSG 124.

Electric current from CTG 116 is transmitted to transmission lines 166 via interconnection lines 120. Electric current is similarly transmitted to transmission lines 166 from STG 142 via interconnection 146. Transmission lines 166 connect grid 164 with system 100. Other electric power generation facilities 170 generate and transmit electric power into grid 164 for use by consumers 168.

Controller 162 includes a processor (not shown in FIG. 1), a memory (not shown in FIG. 1), a plurality of input channels (not shown in FIG. 1), and a plurality of output channels (not shown in FIG. 1) and may include a computer (not shown in FIG. 1). As used herein, the term computer is not limited to just those integrated circuits referred to in the art as a computer, but broadly refers to a processor, a microcontroller, a microcomputer, a programmable logic controller, an application specific integrated circuit, and other programmable circuits, and these terms are used interchangeably herein. In the exemplary embodiment, memory may include, but is not limited to, a computer-readable medium, such as a random access memory. Alternatively, a floppy disk, a compact disc—read only memory (CD-ROM), a magneto-optical disk (MOD), and/or a digital versatile disc (DVD) may also be used. Also, in the exemplary embodiment, a plurality of input channels may represent, but not be limited to, computer peripherals associated with an operator interface such as a mouse and a keyboard. Alternatively, other computer peripherals may also be used, for example, a scanner. Furthermore, in the exemplary embodiment, a plurality of output channels may include, but not be limited to, an operator interface monitor.

Controller 162 receives a plurality of inputs from a plurality of sensors, some of which include sensors 120 and 144, processes the inputs, generates appropriate outputs based on programmed algorithms and discrete circumstances, and transmits signals to the appropriate system 100 components to bias those components. For example, in the event of a small downward frequency transient on grid 164, i.e., approximately 0.5 Hz or less, controller 162 will receive a frequency input transmitted from sensors 120. Controller 162 subsequently induces an opening bias for inlet guide vane 102 and fuel valve 110. Inlet guide vane 102 is modulated throughout the transient such that predetermined margins to potential compressor surge conditions are maintained. Combustion within combustor 106 increases and induces a similar increase in gas stream mass flow rate and gas stream temperature. The change in gas stream temperature is maintained within a range of predetermined temperature and temperature gradient parameters to mitigate potential stresses in turbine 112 components. Turbine 112 accelerates and the rotational acceleration is induced in generator 116 via shaft 114, thereby inducing a partial increase in grid 164 frequency towards the nominal system frequency value, for example, 50 Hz for Europe and 60 Hz for North America. Similarly, for a sensed increase in grid frequency of approximately 0.5 Hz or less, controller 162 receives a frequency input from sensors 120 and induces a closing bias to air guide vane 102 and fuel valve 110 to decrease mass flow rate and temperature of the gas stream generated by combustor 106. The subsequent induced deceleration of shaft 114 via turbine 112 also decelerates CTG 116 and a grid 164 frequency decrease towards the nominal value of frequency is induced.

A similar process may be observed for STG 142. Sensors 144 sense a decrease in grid 164 frequency and transmit an associated signal to controller 162. Controller 162 induces an opening bias to steam valve 136. Valve 136 is opened at a rate consistent with maintaining steam header 134 pressure upstream and downstream of valve 136 within a range of predetermined parameters. Also, appropriate control of HRSG 124 is maintained such that any subsequent changes in steam temperature are maintained within a range of predetermined temperature and temperature gradient parameters to mitigate potential stresses in turbine 138 components.

Figure 2:
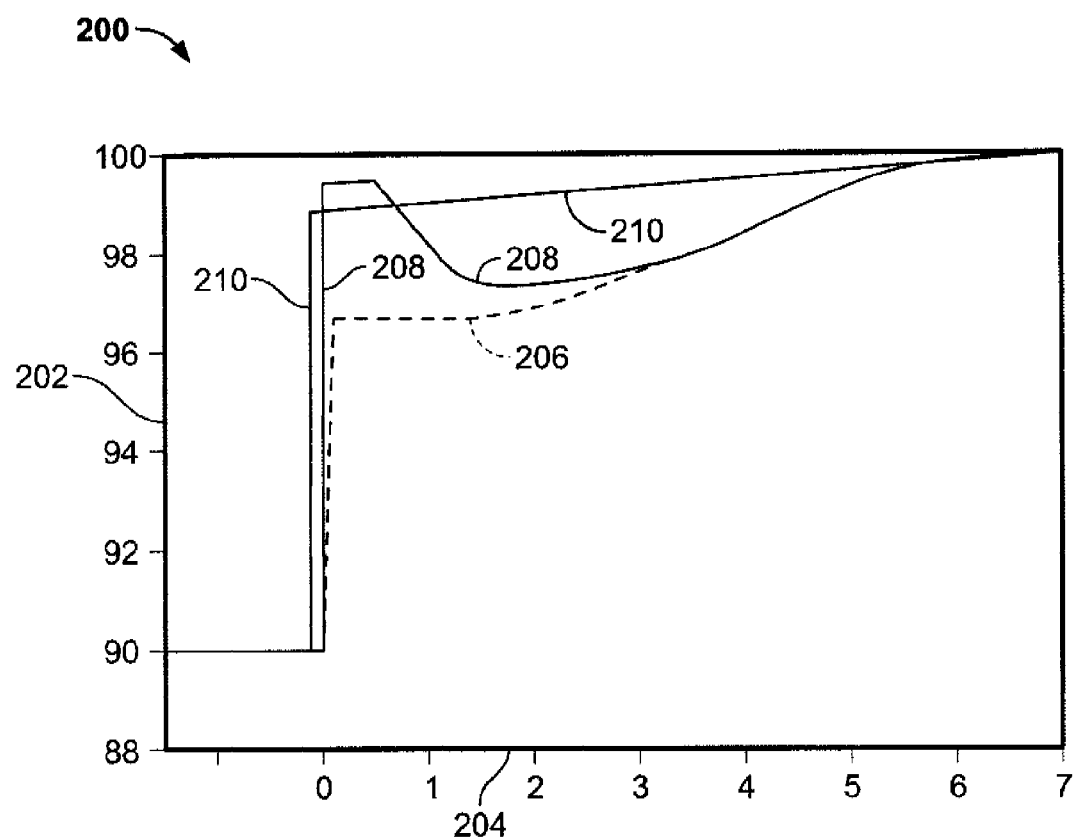
FIG. 2 is a graphical illustration of an exemplary response of the combined-cycle power system in FIG. 1.

FIG. 2 is a graphical illustration 200 of an exemplary response of combined-cycle power system 100 (shown in FIG. 1) to an electric power grid 164 under-frequency condition. Response graph 200 includes ordinate 202 (y-axis) in increments of 2% representing approximate electric power outputs of CTG 116 and STG 142 as a function of time. Ordinate 202 includes a value of 88% at the origin of graph 200 and 100% as the uppermost limit, corresponding to CTG 116 and STG 142 MCR. Graph 200 also includes abscissa (x-axis) 204 that illustrates time in minutes using one minute increments. Time=0 indicates the initiation of an under-frequency transient on electric power grid 164. Time=7 minutes illustrates the transient and system 100 response being substantially complete. Curve 206 illustrates a potential CTG 116 output response versus time. Curve 208 illustrates a potential STG 142 output response versus time without the invention described herein for comparison purposes. Curve 210 illustrates a potential STG 142 output response versus time with the invention described herein. FIG. 2 is referenced further below.

Figure 3:
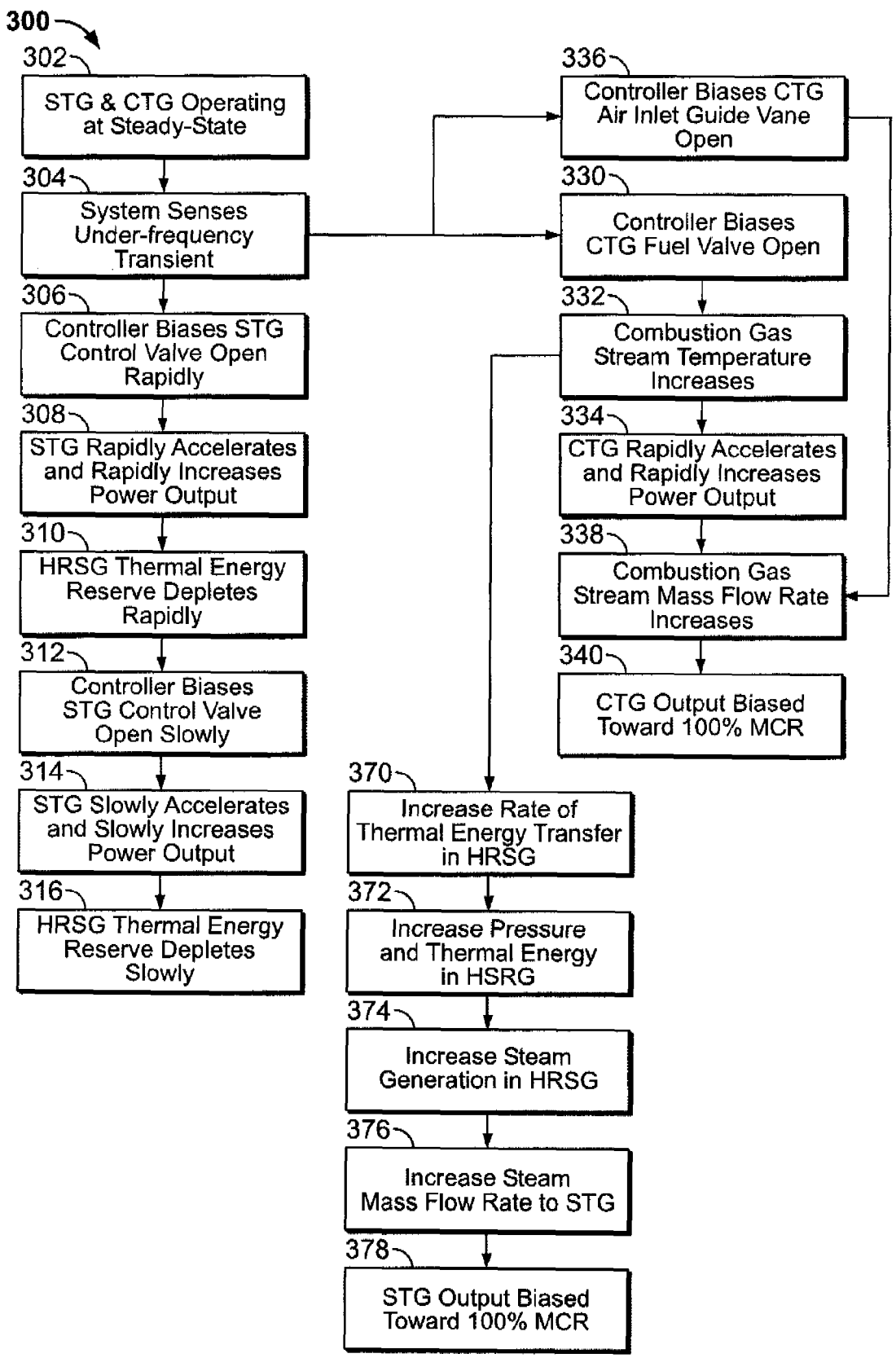
FIG. 3 is a flow chart of an exemplary method of response to an electric power grid under-frequency condition that may be used with the combined-cycle power system in FIG. 1.

FIG. 3 is a flow chart of an exemplary method 300 of a response to an electric power grid under-frequency condition that may be used with combined-cycle power system 100 (shown in FIG. 1). Referring to FIG. 1, method step 302 of exemplary method 300 includes operating STG 142 and CTG 116 at substantially steady-state conditions with both STG 142 and CTG 116 operating at a partial load below MCR. Valve 136, vane 102 and valve 110 are in throttled positions such that system 100 may referred to as operating in a frequency-sensitive mode of electric power generation. Alternatively, system 100 may be operated in a nominal dispatch mode, wherein an electric power dispatching authority directs system 100 and other facilities 170 generation output. In the exemplary embodiment, the partial load below MCR is 90% of MCR for CTG 116 and STG 142 as illustrated in FIG. 2.

In order to facilitate step 302, valve 136, sensors 144, and controller 162 cooperate to operate system 100 in frequency-sensitive mode. Valve 136 is configured and positioned and cooperates with controller 162 such that valve 136 is in a throttled position. A plurality of valve 136 positions between the fully open and fully closed positions, in conjunction with a corresponding HRSG 124 backpressure for each position, facilitates generating a particular steam mass flow rate. HRSG 124 backpressure facilitates maintaining a reservoir of substantially immediately available power that may be used as described below. Controller 162 transmits signals that move valve 136 appropriately to generate power while maintaining the appropriate backpressure to respond to a power increase demand. Controller 162 moves valve 136 as a function of existing power demand, existing steam flow rate, existing grid frequency, and existing HRSG backpressure. The cooperation of valve 136, controller 162 and sensors 144 are described further below. It is noted that the aforementioned cooperation permits system 100 to operate at output levels that facilitate potential additional revenue generation.

Step 304 of exemplary method 300 includes system 100 sensing an under-frequency condition on grid 164 via sensors 120 and 144. This event corresponds to time=0 minutes in FIG. 2. The illustrated under-frequency condition may be a result of a trip of one or more generating units 170 or a large increase in electric power demand by consumers 168 such that a grid frequency decrease may be greater than 0.5 Hz below the standard frequency. Controller 162 interprets the transient as a demand for a rapid electric power generation increase from system 100.

Curve 208 of response graph 200 illustrates a potential response of STG 142 to the aforementioned under-frequency transient without the invention discussed herein and is presented for comparison purposes. In this circumstance, valve 136 rapidly opens to the substantially fully open position. Steam flow to turbine 138 increases rapidly and electric power generation output of STG 142 increases accordingly to a value substantially similar to 100% of MCR. Electric power output remains steady at a value substantially similar to 100% of MCR, however, in less than one minute power output decreases as steam backpressure upstream of valve 136 in HRSG 124 decreases as the thermal energy reserve is depleted. Curve 206 of response graph 200 illustrates CTG 116 response. Controller 162 begins to move vane 102 and valve 110 towards substantially fully open positions. In the exemplary embodiment, inlet guide vane 102 is modulated throughout the transient such that predetermined margins to potential compressor surge conditions are maintained. The use of the thermal energy reserve within HRSG 124 facilitates vane 102 modulation and subsequently increasing the margin to potential surge conditions. Alternatively, methods for active compressor surge management may be integrated into the control scheme. Valve 110 responds more rapidly, thereby peak-firing turbine 112 with a fuel-rich mixture as the air flow from compressor 104 starts to increase. It is noted that the response of CTG 116 is slightly slower than STG 142 due to the finite period of time associated with valve 110 opening (for safety and control purposes) as well as the aforementioned compressor 104 speed decrease in proportion to the CTG 116 frequency decrease. These circumstances associated with CTG 116 are compared to the substantially immediately available additional steam flow capacity residing in HRSG 124 thermal reservoir.

CTG 116 is maintained at a steady output of approximately 96% to 98% of MCR as illustrated by curve 206 on response graph 200. The associated plateau illustrates that CTG 116 initial response is limited to less than 100% MCR since the peak-firing increases combustion gas stream temperature and the gas stream temperature gradient and must be controlled within a range of predetermined parameters to mitigate inducing thermal stresses in turbine 112 components that may have contact with the gas stream and to maintain a fuel-to-air ratio within appropriate guidelines. As increased air flow is induced due to vane 102 opening and CTG 116 accelerating, the mass flow rate through turbine 112 increases and fuel valve 110 is once again biased to open further to admit more fuel. As a result, CTG 116 output increases at a steady rate until substantially 100% of MCR is attained. It is noted that it takes approximately two minutes from system 100 sensing the under-frequency condition to attain the initiation of the steady increase in power output and between six and seven minutes to attain substantially 100% MCR.

As the temperature and the mass flow rate of combustion gas is channeled to HRSG 124 and the associated thermal energy transfer from the gas to the water/steam circuit within HRSG 124 increases, the decrease in STG 142 power output begins to be mitigated and curve 208 follows curve 206 within approximately three minutes of initiation of the transient. STG 142 attains substantially 100% of MCR within seven minutes of initiation of the transient.

The response of system 100 with the invention to an under-frequency condition is demonstrated in method step 306 of exemplary method 300. Step 306 includes controller 162 moving valve 136 towards the fully open position. As described above, controller 162 moves valve 136 as a function of existing power demand, existing steam flow rate, existing grid frequency, and existing HRSG backpressure. Sensors 144 transmit grid frequency, STG 142 power output, steam pressures upstream and downstream of valve 136, mass flow rate of steam to turbine 138, and valve 136 position feedback to controller 162. Controller 162 compares these signals to predetermined values for the associated parameters, i.e., target values, and transmits the appropriate bias signals to valve 136.

Method step 308 of exemplary method 300 includes accelerating STG 142 and rapidly increasing STG 142 electric power output as the mass flow rate of steam increases and the increased mass flow rate is translated into an increased rate of energy conversion from the thermal energy of the steam to the mechanical rotational energy of turbine 138. Curve 210 on FIG. 2 illustrates a potential STG 142 output response versus time with the invention described herein. Valve 136 is opened in cooperation with sensors 144 and controller 162 as described above such that a substantially instantaneous increase in power output of STG 142 to a range of approximately 98% to 99% of MCR is attained. However, the increase is not as pronounced with the invention as without the invention, thereby facilitating mitigating the short-term thermal energy reserve depletion.

Method step 310 of exemplary method 300 includes rapidly depleting the thermal energy reserve. Controller 162 moves valve 136 in a manner that mitigates the rate of depletion of the thermal reserve residing in HRSG 124, however, the amount of the thermal reserve is finite and begins to deplete rapidly at this point in the system 100 response to the transient.

Method step 312 of exemplary method 300 includes inducing an open movement in valve 136 such that valve 136 slowly travels toward the fully open position, thereby slowly increasing the mass flow rate of steam to turbine 138.

Method step 314 of exemplary method 300 includes slowly accelerating STG 142 and slowly increasing STG output. The controlled, slow rate of increase of the mass flow rate of steam to turbine 138 results in a slow, controlled acceleration of STG 142 with an associated increase in power output.

Method step 316 of exemplary method 300 includes mitigating the rate of thermal energy reserve removal from the thermal energy reservoir. Controlling the initial open movement of valve 136 such that the initial thermal energy reserve release is controlled and slowly opening valve 136 thereafter facilitates mitigating a depletion of the thermal energy reserve prior to additional thermal energy from combustion turbine 112 can be channeled to HRSG 124 as described below.

Method step 330 of exemplary method 300 includes initiating peak-firing of combustion turbine 112 via moving fuel valve 110 towards the fully open position. Step 330 is typically performed substantially simultaneously with method step 306.

Method step 332 of exemplary method 300 includes increasing combustion gas temperature. Increasing the fuel/air ratio within a range of predetermined parameters by increasing the fuel input into combustion turbine 112 initiates a temporary peak-firing condition in turbine 112. Controller 162 transmits an open signal to valve 110 such that the temperature of the combustion gas stream is rapidly increased while maintaining the range of gas stream temperature and the rate of temperature increase of the gas within predetermined parameters.

Method step 334 of exemplary method 300 includes rapidly accelerating CTG 116 such that a rapid power output increase is induced as the thermal energy within the combustion gas stream increases and turbine 112 converts the thermal energy to mechanical rotational energy.

Method step 336 of exemplary method 300 includes moving vane 102 towards the fully open position with a subsequent increase in air flow. Step 336 is typically initiated substantially simultaneously with method step 330.

Method 338 of exemplary method 300 includes increasing the combustion gas mass flow rate. Gas mass flow rate is increased as turbine 112 accelerates per method step 334 and compressor 104 accelerates with turbine 112 via shaft 114, and vane 102 is opened toward the fully open position per method step 336.

Method 340 of exemplary method 300 includes increasing CTG 116 output to 100% MCR. As the mass flow rate of air into combustor 106 increases and the fuel/air ratio is returned to a predetermined range of values, controller 162 transmits open signals to vane 102 and valve 110 to continue to accelerate CTG 116 such that mitigating thermal stress parameters of turbine 112 components is facilitated and CTG 116 attains substantially 100% of MCR. Referring to FIG. 2, CTG 116 response as illustrated in curve 206 is substantially similar with and without the invention.

Method step 370 of exemplary method 300 includes increasing the rate of thermal energy transfer to the steam/water circuit in HRSG 124. As turbine 112 exhaust temperature increases per method step 332 and is followed by an increase in the gas mass flow rate per method step 338, the rate thermal energy transfer from the gas stream into tube banks 132, 128 and 126 of HRSG 124 increases.

Method 372 of exemplary method 300 includes increasing the pressure and the thermal energy within HRSG 124. The increased rate of thermal energy transfer into HRSG 124 thermal energy reservoir counters the thermal energy removal due to valve 136 opening.

Method 374 of exemplary method 300 includes increasing steam generation in HRSG 124. The increased thermal energy transfer within HRSG 124 is manifested as an increase in the rate of converting water to steam in the steam/water circuit.

Method 376 of exemplary method 300 includes increased channeling of steam to STG 142. The subsequent increasing of the mass flow rate of steam from HRSG 124 to turbine 138 permits continued biasing of valve 136 toward the fully open position without depleting the thermal energy reserve.

Method step 378 of exemplary method 300 includes increasing power output of STG 142 to 100% of MCR.

Referring to FIG. 2 valve 136 is further moved towards the fully open position at a rate consistent with the facilitating maintenance of the thermal energy reserve in the HRSG 124 thermal reservoir such that a substantially steady rate of power output increase is facilitated. It is noted that the increased thermal energy of the combustion gases from turbine 112 transferred to HRSG 124 is measured and controlled by controller 162 to facilitate the overall system 100 response. It is also noted that the steady ramp illustrated on curve 210 in conjunction with the steady ramp on curve 206 facilitates an improved frequency stabilizing response associated with system 100.

The discussion of method 300 thus far associated with opening valve 136 and depleting and subsequently replenishing the thermal energy reserve within HRSG 124 assumes a linear rate of valve 136 movement and a linear rate of thermal energy depletion and replenishment. In the event of a more dynamic set of conditions, controller 162 includes sufficient computational resources, including the associated programming, to modulate valve 136 more aggressively through the full range of positions between substantially fully open and substantially fully closed as necessary to maintain HRSG 124 backpressure between a predetermined upper pressure value and a predetermined lower pressure value. An example of a lower pressure value may be 16,547 kilopascal (kPa) (2400 pounds per square inch (psi)) and an example of an upper pressure value may be 17,926 kPa (2600 psi). Controller 162 modulates HRSG 124 backpressure as described above in a manner that also modulates the rate of variation in HRSG 124 backpressure while accelerating STG 138 and increasing the thermal energy input rate into HRSG 124 via CTG 112 and duct 122. Given the aforementioned more dynamic conditions and a more aggressive response, curve 210 (shown in FIG. 2) may be illustrated as less linear and more sinusoidal, or saw toothed while maintaining a substantially upward slope. Controller 162 includes the computational resources that mitigate the amplitudes and periods of the sinusoidal or saw-toothed response to drive the associated response toward a substantially linear response. Additionally, controller 162 modulates the additional fuel and air to CTG 112 such that system 100 overall response to a grid 166 under-frequency condition is an increase in system 100 output frequency. For example, as valve 136 is moved toward the closed position to maintain HRSG 124 pressure above a lower threshold limit, CTG 112 may be accelerated further to maintain system 100 response. As valve 136 is moved toward the open position to maintain HRSG 124 pressure below an upper threshold limit, CTG 112 rate of acceleration may be decreased to maintain system 100 response. Curve 206 may also attain a less linear and more sinusoidal, or saw toothed shape while maintaining the overall shape as illustrated in FIG. 2.

Figure 4:
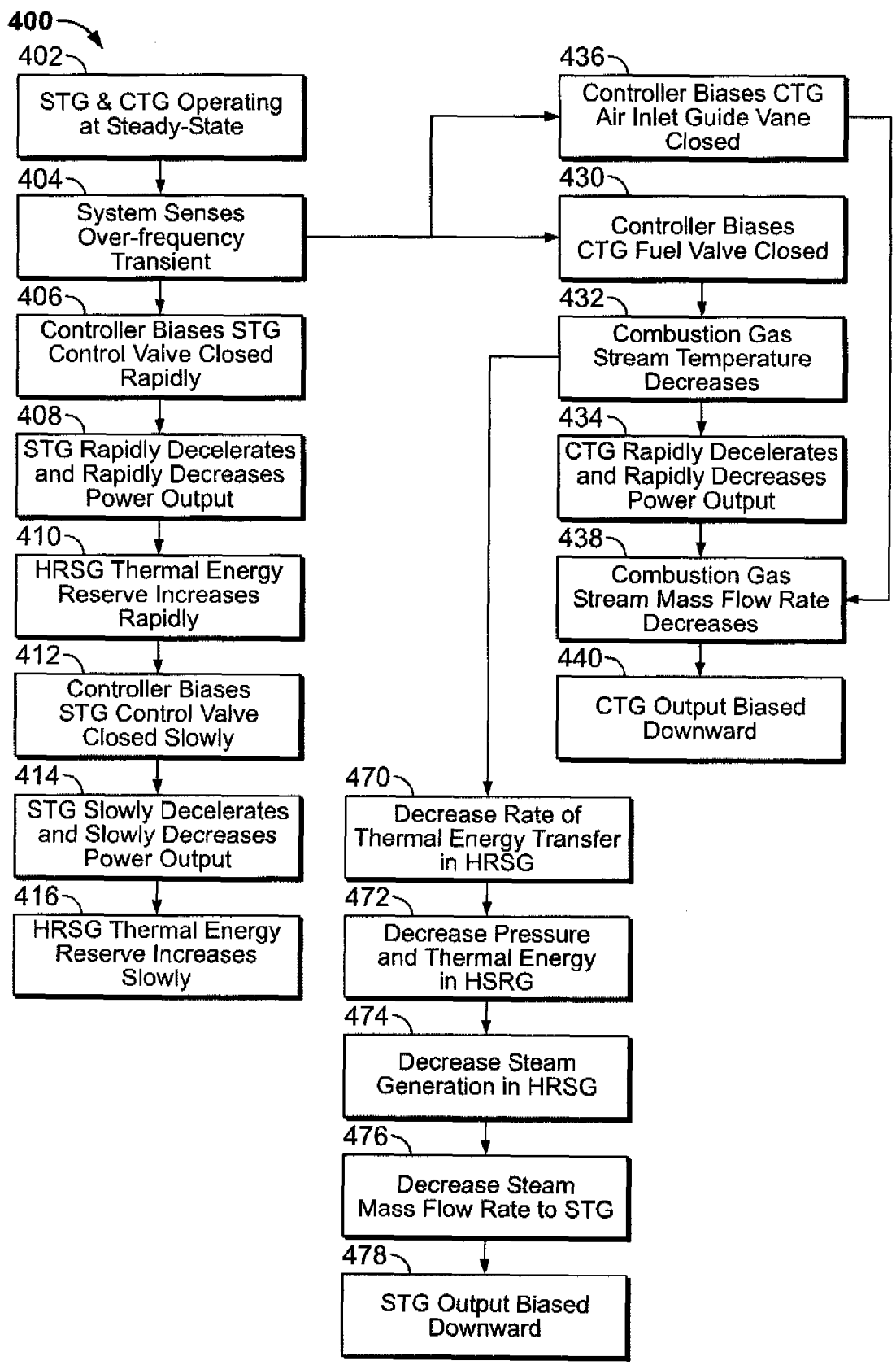
FIG. 4 is a flow chart of an exemplary method of response to an electric power grid over-frequency condition that may be used with the combined-cycle power system in FIG. 1.

FIG. 4 is a flow chart of an exemplary method 400 of a response to an electric power grid over-frequency condition that may be used with combined-cycle power system 100 (shown in FIG. 1). Referring to FIG. 1, method step 402 of exemplary method 400 includes operating STG 142 and CTG 116 at substantially steady-state conditions with both STG 142 and CTG 116 operating at a partial load below MCR. Valve 136, vane 102 and valve 110 are in throttled positions such that system 100 may referred to as operating in a frequency-sensitive mode of electric power generation. Alternatively, system 100 may be operated in a nominal dispatch mode, wherein an electric power dispatching authority directs system 100 and other facilities 170 generation output. In the exemplary embodiment, the partial load below MCR is 90% of MCR for CTG 116 and STG 142.

In order to facilitate step 402, valve 136, sensors 144, and controller 162 cooperate to operate system 100 in frequency-sensitive mode. Valve 136 is configured and positioned and cooperates with controller 162 such that valve 136 is in a throttled position. A plurality of valve 136 positions between the fully open and fully closed positions, in conjunction with a corresponding HRSG 124 backpressure for each position, facilitates generating a particular steam mass flow rate. HRSG 124 backpressure facilitates maintaining a reservoir of substantially immediately available capacity to store thermal energy as described below. Controller 162 transmits signals that move valve 136 appropriately to generate power while maintaining the appropriate backpressure to respond to a power decrease demand. Controller 162 moves valve 136 as a function of existing power demand, existing steam flow rate, existing grid frequency, and existing HRSG backpressure. The cooperation of valve 136, controller 162 and sensors 144 are described further below.

Step 404 of exemplary method 400 includes system 100 sensing an over-frequency condition on grid 164 via sensors 120 and 144. The over-frequency condition may be a result of an addition of, or a power output increase of, one or more generating units 170 or a large decrease in electric power demand by consumers 168 such that a grid frequency increase may be greater than 0.5 Hz above the standard frequency. Controller 162 interprets the transient as a demand for a rapid electric power generation decrease from system 100.

The response of system 100 with the invention to an over-frequency condition is demonstrated in method step 406 of exemplary method 300. Step 406 includes controller 162 moving valve 136 towards the closed position. As described above, controller 162 moves valve 136 as a function of existing power demand, existing steam flow rate, existing grid frequency, and existing HRSG backpressure. Sensors 144 transmit grid frequency, STG 142 power output, steam pressures upstream and downstream of valve 136, mass flow rate of steam to turbine 138, and valve 136 position feedback to controller 162. Controller 162 compares these signals to predetermined values for the associated parameters, i.e., target values, and transmits the appropriate bias signals to valve 136.

Method step 408 of exemplary method 300 includes decelerating STG 142 and rapidly decreasing STG 142 electric power output as the mass flow rate of steam decreases and the decreased mass flow rate is translated into a decreased rate of energy conversion from the thermal energy of the steam to the rotational energy of turbine 138. Valve 136 is moved closed in cooperation with sensors 144 and controller 162 as described above such that a substantially instantaneous decrease in power output of STG 142 is attained.

Method step 410 of exemplary method 400 includes rapidly increasing the thermal energy reserves within the thermal energy reservoir. Controller 162 moves valve 136 in a manner that mitigates the rate of increase of the thermal reserve residing in HRSG 124, however, the capacity of the thermal reserve is finite and begins to "fill" rapidly at this point in the system 100 response to the transient.

Method step 412 of exemplary method 400 includes inducing a closing movement in valve 136 such that valve 136 slowly travels toward the fully closed position, thereby slowly decreasing the mass flow rate of steam to turbine 138.

Method step 414 of exemplary method 400 includes slowly decelerating STG 142 and slowly decreasing STG output. The controlled, slow rate of decrease of the mass flow rate of steam to turbine 138 results in a slow, controlled deceleration of STG 142 with an associated decrease in power output.

Method step 416 of exemplary method 400 includes mitigating the rate of thermal energy reserve addition to the thermal energy reservoir. Controlling the initial closing movement of valve 136 such that the initial thermal energy reserve absorption is controlled and slowly closing valve 136 thereafter facilitates mitigating an increase of the thermal energy reserve prior to a reduction of thermal energy from combustion turbine 112 can be channeled to HRSG 124 as described below. Step 416 facilitates mitigating the potential for a steam pressure increase to exceed HRSG 124 component ratings.

Method step 430 of exemplary method 400 includes initiating under-firing of combustion turbine 112 via moving fuel valve 110 towards the closed position. Step 430 is typically performed substantially simultaneously with method step 406.

Method step 432 of exemplary method 400 includes decreasing combustion gas temperature. Decreasing the fuel/air ratio within a range of predetermined parameters by decreasing the fuel input into combustion turbine 112 initiates a temporary under-firing condition in turbine 112. Controller 162 transmits a closing signal to valve 110 such that the temperature of the combustion gas stream is rapidly decreased while maintaining the range of gas stream temperature and the rate of temperature decrease of the gas within predetermined parameters.

Method step 434 of exemplary method 400 includes rapidly decelerating CTG 116 such that a rapid power output decrease is induced as the thermal energy within the combustion gas stream decreases and turbine 112 converts less of the thermal energy to rotational energy.

Method step 436 of exemplary method 400 includes moving vane 102 towards the closed position with a subsequent decrease in air flow. Step 436 is typically initiated substantially simultaneously with method step 430.

Method 438 of exemplary method 400 includes decreasing the combustion gas mass flow rate. Gas mass flow rate is decreased as turbine 112 decelerates per method step 434 and compressor 104 decelerates with turbine 112 via shaft 114, and vane 102 is moved toward the closed position per method step 436.

Method 440 of exemplary method 400 includes decreasing CTG 116 output to a value consistent with grid 164 frequency. As the mass flow rate of air into combustor 106 decreases and the fuel air ratio is returned to a predetermined range of values, controller 162 transmits closing signals to vane 102 and valve 110 to continue to decelerate CTG 116 such that mitigating thermal stress parameters of turbine 112 components is facilitated and CTG 116 attains an output to a value consistent with grid 164 frequency.

Method step 470 of exemplary method 400 includes decreasing the rate of thermal energy transfer to the steam/water circuit in HRSG 124. As turbine 112 exhaust temperature decreases per method step 432 and is followed by a decrease in the gas mass flow rate per method step 438, the rate thermal energy transfer from the gas stream into tube banks 132, 128 and 126 of HRSG 124 decreases.

Method 472 of exemplary method 400 includes decreasing the pressure and the thermal energy within HRSG 124. The decreased rate of thermal energy transfer into HRSG 124 thermal energy reservoir counters the thermal energy addition due to valve 136 closing.

Method 474 of exemplary method 400 includes decreasing steam generation in HRSG 124. The decreased thermal energy transfer within HRSG 124 is manifested as a decrease in the rate of converting water to steam in the steam/water circuit.

Method 476 of exemplary method 400 includes transmitting steam to STG 142. The subsequent decreasing of the mass flow rate of steam from HRSG 124 to turbine 138 permits continued moving of valve 136 toward the closed position without increasing the thermal energy reserve.

Method step 478 of exemplary method 400 includes decreasing power output of STG 142 to an output value consistent with grid 164 frequency. Valve 136 is further moved towards the closed position at a rate consistent with the facilitating maintenance of the thermal energy reserve in the HRSG 124 thermal reservoir such that a substantially steady rate of power output decrease is facilitated. It is noted that the decreased thermal energy of the combustion gases from turbine 112 transferred to HRSG 124 is measured and controlled by controller 162 to facilitate the overall system 100 response.

The discussion of method 400 thus far associated with closing valve 136 and replenishing the thermal energy reserve within HRSG 124 assumes a linear rate of valve 136 movement and a linear rate of thermal energy replenishment. In the event of a more dynamic set of conditions, controller 162 includes sufficient computational resources, including the associated programming, to modulate valve 136 more aggressively through the full range of positions between substantially fully open and substantially fully closed as necessary to maintain HRSG 124 backpressure between a predetermined upper pressure value and a predetermined lower pressure value. Controller 162 modulates HRSG 124 backpressure as described above in a manner that also modulates the rate of variation in HRSG 124 backpressure while decelerating STG 138 and decreasing the thermal energy input rate into HRSG 124 via CTG 112 and duct 122. Given the aforementioned more dynamic conditions and a more aggressive response, the response may be illustrated as less linear and more sinusoidal, or saw toothed while maintaining a substantially downward slope. Controller 162 includes the computational resources that mitigate the amplitudes and periods of the sinusoidal or saw-toothed response to drive the associated response toward a substantially linear response. Additionally, controller 162 modulates the reduction in fuel and air to CTG 112 such that system 100 overall response to a grid 166 over-frequency condition is a decrease in system 100 output frequency. For example, as valve 136 is moved toward the closed position to maintain HRSG 124 pressure above a lower threshold limit, CTG 112 rate of deceleration may be reduced to maintain system 100 response. As valve 136 is moved toward the open position to maintain HRSG 124 pressure below an upper threshold limit, CTG 112 rate of deceleration may be increased to maintain system 100 response.

The methods and apparatus for an electric power grid frequency control sub-system described herein facilitate operation of a combined-cycle power system. More specifically, designing, installing and operating an electric power grid frequency control sub-system as described above facilitates operation of a combined-cycle power system by using thermal energy storage capacities to facilitate maintaining a standardized electric power grid frequency during under-frequency transients on a connected electric power grid. Furthermore, over-frequency transients on the connected electric power grid may also be mitigated with the electric power grid frequency control sub-system. As a result, maintenance of a stable electric power grid frequency may be facilitated and extended maintenance costs and combined-cycle power system outages may be reduced or eliminated.

Although the methods and apparatus described and/or illustrated herein are described and/or illustrated with respect to methods and apparatus for a combined-cycle power system, and more specifically, a electric power grid frequency control sub-system, practice of the methods described and/or illustrated herein is not limited to electric power grid frequency control sub-systems nor to combined-cycle power systems generally. Rather, the methods described and/or illustrated herein are applicable to designing, installing and operating any system.

Exemplary embodiments of electric power grid frequency control sub-systems as associated with combined-cycle power systems are described above in detail. The methods, apparatus and systems are not limited to the specific embodiments described herein nor to the specific electric power grid frequency control sub-system designed, installed and operated, but rather, the methods of designing, installing and operating electric power grid frequency control sub-systems may be utilized independently and separately from other methods, apparatus and systems described herein or to designing, installing and operating components not described herein. For example, other components can also be designed, installed and operated using the methods described herein.

While the invention has been described in terms of various specific embodiments, those skilled in the art will recognize that the invention can be practiced with modification within the spirit and scope of the claims.

What is claimed is:

1. A method of operating a combined-cycle power system coupled to an electric power grid, the combined-cycle system, including at least one electric power generator, at least one steam turbine coupled to the generator, at least one combustion turbine coupled to the generator, and at least one steam source having a thermal energy reservoir, the thermal energy reservoir being in flow communication with the steam turbine via at least one control valve, said method comprising:

operating the steam turbine at a first electric power output, operating the combustion turbine at a first electric power output, and operating the steam source at a first thermal energy level, the steam turbine having at least one control valve in a first position, the combustion turbine having at least one air inlet guide vane in a first position, the steam turbine and the combustion turbine being synchronized to an operating frequency of the grid, so that the steam turbine, the combustion turbine, and the grid are operating at a frequency substantially similar to a standardized grid frequency value; and
    upon sensing a grid frequency deviation away from the standardized grid frequency value, then:
    moving the at least one combustion turbine air inlet guide vane to a second position; and
    moving the at least one steam turbine control valve to a second position thereby inducing a thermal energy transfer between the thermal energy reservoir and the steam turbine, moving the thermal energy reservoir energy level to a second energy level, thereby facilitating a predetermined rate of a grid frequency recovery for a predetermined period of time, the predetermined rate of frequency recovery being substantially uniform.

2. A method in accordance with claim 1 wherein moving the at least one steam turbine control valve to a second position comprises increasing a steam mass flow rate to the steam turbine.

3. A method in accordance with claim 1 wherein moving the at least one steam turbine control valve to a second position comprises decreasing a steam mass flow rate to the steam turbine.

4. A method in accordance with claim 1 wherein moving the at least one combustion turbine inlet guide vane to a second position comprises increasing a combustion gas mass flow rate to the combustion turbine.

5. A method in accordance with claim 1 wherein moving the at least one combustion turbine inlet guide vane to a second position comprises decreasing a combustion gas mass flow rate to the combustion turbine.

6. A method in accordance with claim 1 wherein moving the thermal energy reservoir energy level to a second energy level comprises decreasing and subsequently increasing a steam pressure within the steam source.

7. A combined-cycle power system, said system comprises:

at least one steam turbine, said steam turbine comprises at least one pipe, said pipe comprises at least one steam flow control valve, said at least one steam flow control valve being moved toward a substantially open position in response to a grid under-frequency condition and toward a substantially closed position in response to a grid over-frequency condition;
    at least one steam source in flow communication with said steam turbine via said pipe, said steam source comprises at least one thermal energy reservoir, wherein said at least one thermal energy reservoir comprises at least one cavity;
    at least one combustion turbine, said combustion turbine comprises at least one air inlet guide vane, said at least air one inlet guide vane being moved toward a substantially open position in response to a grid under-frequency condition and toward a substantially closed position in response to a grid over-frequency condition;
    at least one electric power generator, said generator being electrically coupled to an electric power grid, said generator frequency and the grid frequency being synchronized to an operating frequency of the grid, such that said steam turbine, said combustion turbine, and the grid are operating at a frequency substantially similar to a standardized grid frequency value;
    a plurality of process feedback mechanisms, said feedback mechanisms comprise a plurality of process measurement sensors; and
    at least one electronic controller, said at least one electronic controller comprises at least one electronically stored control program, a plurality of electronic input channels, a plurality of electronic output channels, and at least one operator interface device, such that said at least one steam flow control valve and said at least one air inlet guide vane cooperate to continuously facilitate a predetermined rate of a grid frequency recovery for a predetermined period of time, such that the predetermined rate of frequency recovery is substantially uniform.

8. A combined-cycle power system in accordance with claim 7 wherein said at least one steam source comprises a heat recovery steam generator.

9. A combined-cycle power system in accordance with claim 7 wherein said steam turbine, said combustion turbine, and said generator are rotatably coupled together on a common rotatable shaft such that said control valve, said air inlet guide vane, and said controller cooperate to move said control valve and said guide vane toward a substantially open position to accelerate said common rotatable shaft in response to a grid under-frequency condition and toward a substantially closed position to decelerate said common rotatable shaft in response to a grid over-frequency condition.

10. A combined-cycle power system in accordance with claim 7 wherein at least one generator comprises a first generator, said first generator being rotatably coupled to said steam turbine such that said steam turbine control valve facilitates an acceleration and a deceleration of said first generator.

11. A combined-cycle power system in accordance with claim 7 wherein at least one generator further comprises a second generator, said second generator being rotatably coupled to said combustion turbine such that said combustion turbine air inlet guide vane facilitates an acceleration and a deceleration of said second generator.

12. A combined-cycle power system in accordance with claim 7 wherein said at least one energy reservoir comprises a cavity in flow communication with said steam turbine control valve, said cavity comprises dimensions and a position within said steam source such that sufficient thermal energy storage capacity to accelerate said steam turbine at a predetermined rate for a predetermined period of time in response to a grid under-frequency condition is available for release, and said cavity further comprises dimensions and a position within said steam source such that sufficient thermal energy storage capacity is available to accumulate said steam source thermal energy at a predetermined rate for a predetermined period of time in response to a grid over-frequency condition.

* * * * *